UNITED STATES PATENT OFFICE.

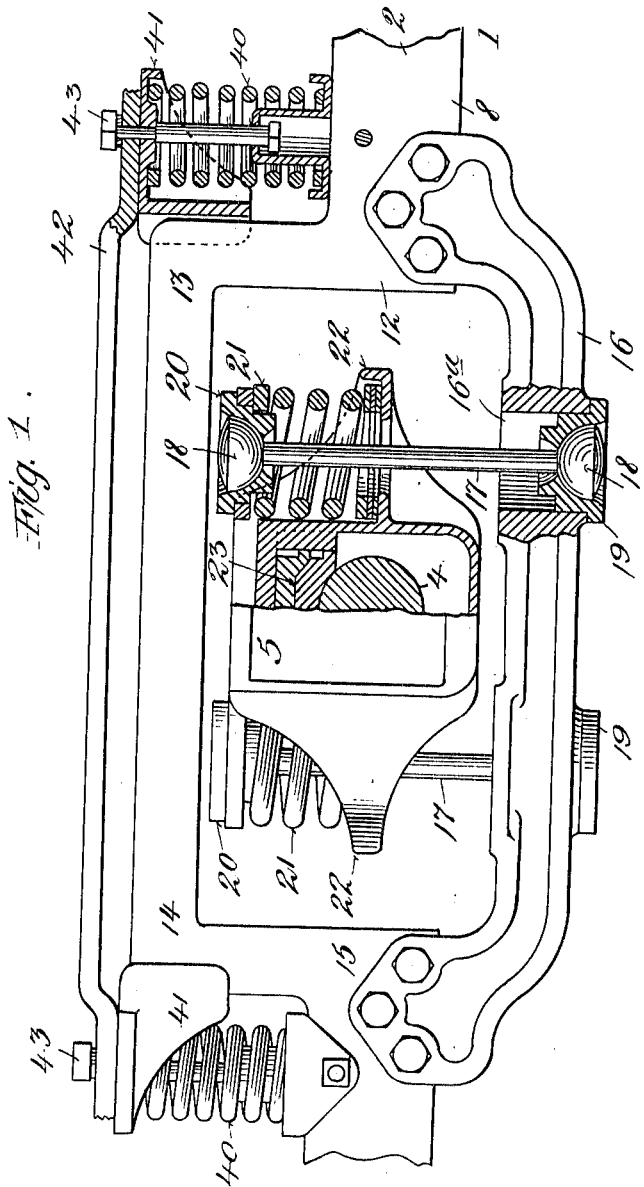

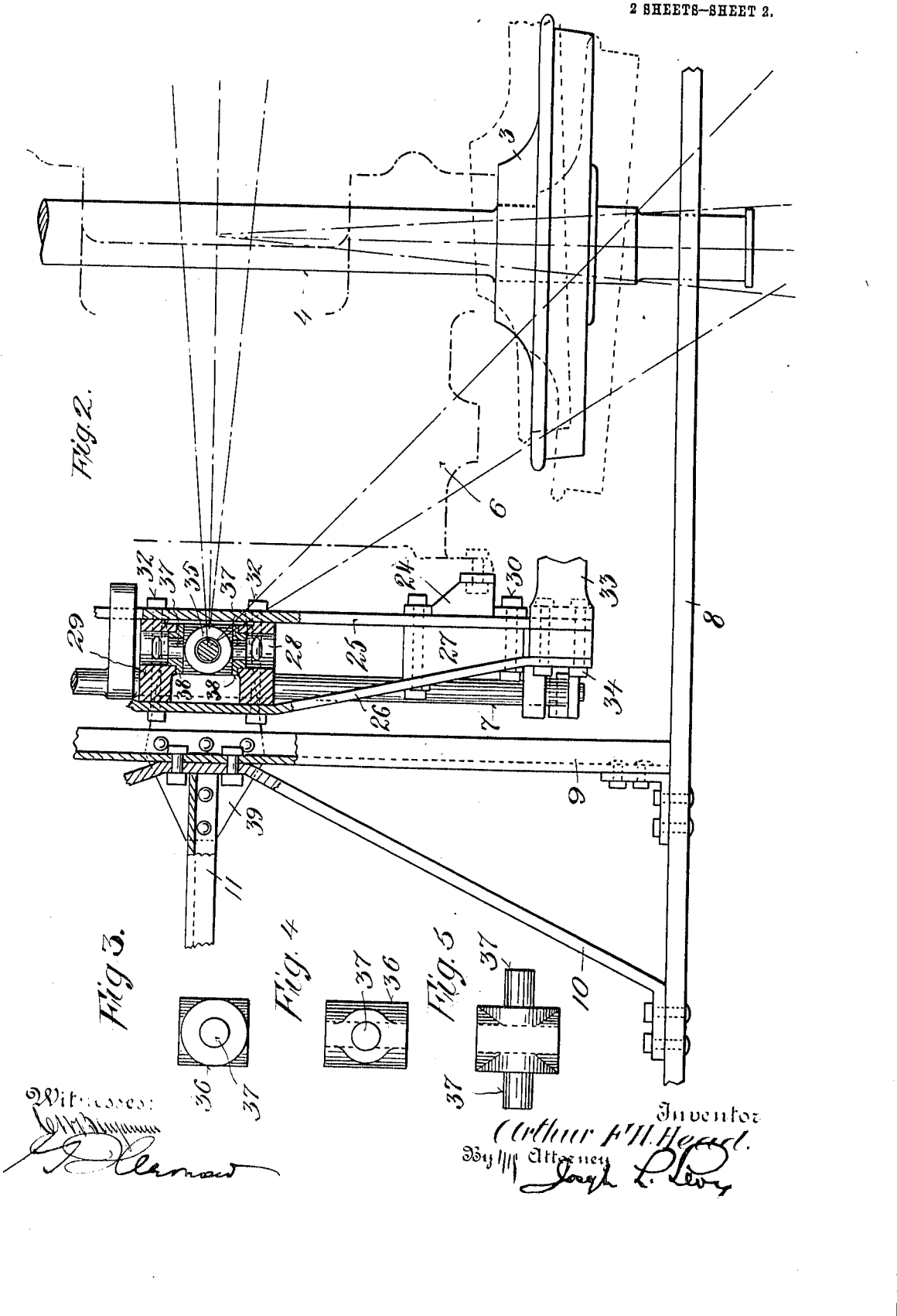

ARTHUR F. H. HEAD, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,096,367.      Specification of Letters Patent.      Patented May 12, 1914.

Original application filed November 2, 1910, Serial No. 590,312. Divided and this application filed March 11, 1911, Serial No. 613,672. Renewed January 15, 1914. Serial No. 812,340.

*To all whom it may concern:*

Be it known that I, ARTHUR F. H. HEAD, a subject of the King of Great Britain, and a resident of the city of Philadelphia, county of Philadelphia, and State of Pennsylvania, have invented a new and useful Improvement in Car-Trucks, of which the following is a specification.

The object of this invention is to provide a truck in which the axles may have a radial movement in going around curves and at the same time provide a truck in which there will be little or no oscillation or vibration either on a straight or a curved track.

This application is a divisional one, the original application being the one filed by me Nov. 2, 1910, Ser. No. 590,312.

For a more particular description of the present invention, reference is to be had to the accompanying drawings, forming a part thereof and the appended claims.

Figure 1 is a side elevation, partially in section, of a portion of a truck embodying my invention. Fig. 2 is a plan view of a portion of a truck showing some of the structure shown in Fig. 1, but not all of the same, parts being omitted to more clearly reveal the structure. Figs. 3, 4 and 5 are plan view, an end elevation and a side elevation respectively of a king bolt sleeve.

Throughout the various views of the drawings, similar reference characters designate similar parts.

The improved truck 1 comprises a frame 2, wheels 3, axles 4, axle boxes 5, motor casing 6, brake mechanism 7, and connecting parts. The frame A may be of any suitable construction and preferably consists of side bars 8, (one on each side) united by crossing 9 and braces 10, and a suitable reinforcement 11 which unites the crossings and bracings, the structure for part of one axle and one wheel only being shown, it being understood that the remaining parts are repeated where necessary. The side frames 8 are upwardly bent at 12 and then extend horizontally at 13 and are finally bent down at 14 to form yokes and bent out at 15 to form a continuation of the frame 8. A yoke brace 16 supplements the parts 12, 13, 14, and 15 as shown and is fixed to the side frame 8 below the yoke by bolts or other suitable means. The yoke brace 16 contains two parallel perforations 16ª through which extend box spring posts 17. Each spring post 17 has a suitable spherical head 18 at each end thereof. The lower head 18 rests in a cup 19 in the opening 16ª and the upper head 18 rests in a cap 20 on a coiled spring 21 that rests on a suitable ear 22 that extends laterally from the axle box 5, as shown. There are two of these projections 22 from each axle box and two sets of coiled springs 21, caps 20, etc., as shown. The axle boxes 5 are connected to the axles 4 through the usual brasses 23 and these axles 4 carry the wheels 3 in the usual manner, as above set forth. The motor casing 6 is also journaled on the axle 4 in the conventional manner, but is supported at its outer end in a novel manner which I will now describe. The free end of the motor casing 6 is bolted to suitable brackets 24 which are secured to the bars 25 and 26 by means of the bolts 30 and 31 which with the bolts 32 secure the spacing blocks 27, 28 and 29 and the bars 25 and 26 are so held in proper relation. The bar 25 is straight, and the bar 26 is bent so that the spacing blocks 28 and 29 are wider than the blocks 27. At each end of the bars 25 and 26 are the brake brackets 33 which are held in place by bolts 34 or other suitable means. As the brake mechanism forms no part of this invention it is not necessary to describe it further.

The principal features connected with the motor casing which are new in this case, center about the king bolt 35 which is mounted in the following manner. This king bolt 35 passes through a king bolt holder 36, which is shown in Figs. 3, 4 and 5. This king bolt holder 36 is provided with trunnions 37 which enter sleeves 38 that are placed in perforations in the spacing bars 28 and 29 so that the holder 36 would swing freely about a horizontal axis. It has a movement on a vertical axis on the king bolt 35 on which this holder 36 is sleeved so that between the two there is a double joint connection, to a limited extent, between the axle 4 and the frame 2 through the king bolt 35. This king bolt 35 also passes through suitable plates 39 which are secured to the crossing 9, braces 10 and 11.

It is hardly necessary to show or explain the spring system of the truck in any detail, as this is old. Each side frame 8 has suitable coiled springs 40 mounted thereon, in the conventional manner, and each spring 40 is surmounted by a cap 41 which has suitable flanges that are adapted to rub against the vertical parts of the frame 8 and so guide the bar 42 to which the car body is secured. Suitable bolts 43, of the usual character, pass through the coiled springs 40 in the conventional manner.

In view of the foregoing, the operation of my improved truck will be readily understood. Assuming that it is passing on a straight or rough track, the flexible connection between the axles 4 and the frame 2 both through the posts 17 and the king bolt 35, permit the axle 4 to radiate slightly or to swing sufficiently so as to compensate for the inequalities of the track and yet any movement that takes place will be checked by the friction of the spherical heads 18 on their respective seats. When passing around a curve the axle 4 will swing from the king bolt 35 as a center and cause the posts 17 to pass from their normal and vertical position to an inclined position in which event the friction of the parts will reduce, or tend to reduce, all oscillations after the truck has passed the curve and resumed its journey on a straight track.

While I have shown and described one embodiment of my invention, it is obvious that it is not restricted thereto but is sufficiently broad to cover all structures that come within the scope of the annexed claims.

What I claim is:—

1. In a truck of the class described, an axle, a motor casing, bars secured to said motor casing, spacing blocks supported between the said bars, a king bolt casing trunnioned in one of said spacing blocks and adapted to shift about a horizontal axis and a king bolt with a vertical axis adapted to pass through said king bolt casing and means for supporting said king bolt from a truck frame.

2. In a truck of the class described, an axle, axle boxes, brasses, a frame, a motor casing, a double joint connection with axes at right angles between said casing and frame and means for connecting said axle boxes and frame.

3. In a truck of the class described, an axle, axle boxes, a frame, a motor casing, means for connecting said frame and motor casing through two sets of pivots having their axes at right angles, so that the axle may have a compound movement with regard to said frame.

4. In a truck of the class described, a side frame, a yoke with a yoke brace secured to said side frame, openings in said yoke brace, seats with spherical surfaces resting in said openings, posts with corresponding spherical surfaces having one end resting in said seats, spherical surfaces at the other end of said posts, caps engaging last mentioned spherical surfaces, springs supporting said caps and means for supporting said springs.

5. In a truck of the class described, a side frame, a yoke secured to said side frame, a yoke brace supplementing said yoke and secured to the side frame below said yoke, box spring bolts passed through said yoke brace and having spherical heads, spherical bearings for said heads and an axle box having projections and springs bearing against said projections between the same and one of the spherical bearings of said bolts.

6. In a truck of the class described, an axle, a motor casing, a king bolt casing trunnioned on means supported by said motor casing to shift about a horizontal axis, a king bolt adapted to pass through said king bolt casing, and means for supporting said king bolt from a truck frame.

7. In a truck of the class described, axles, a box-frame or saddle having projections extending outwardly on both sides, bearing-supports extending upwardly from said projections, a bearing in the upper portion of said support, car-supporting means located outside of and adjacent the said supports, and links pivotally secured at the top and bottom to said bearing supports and car-supporting means.

8. In a truck of the class described, axles, a box frame or saddle having projections extending outwardly on both sides, supports for a bearing extending upwardly from said projections, a bearing in the upper portion of said supports, links journaled in said bearings and pendant therefrom on both sides of the box, car-supporting connections located outside of and adjacent the links, a journal-bearing on the lower end of the links, and a bearing in the lower ends of said connections receiving the lower link journal-bearing.

9. In a truck of the class described, an axle box, perforated lugs connected to said axle boxes, cups and means for connecting said cups with a car-body and rods with hemispherical balls connecting said lugs and cups.

10. In a truck of the class described, an axle box, perforated lugs, springs on said lugs, caps on said springs, cups, means connecting said cups with a car body and rods with hemispherical ends connecting said cups and caps.

Signed at the city of Philadelphia, county of Philadelphia and State of Pennsylvania, this 9th day of March, 1911.

ARTHUR F. H. HEAD.

Witnesses:
GUSTAVE I. ARONOW,
FLORENCE EDENHOLM.